United States Patent [19]

Girardin

[11] Patent Number: 4,565,915
[45] Date of Patent: Jan. 21, 1986

[54] TRAVELLING WIRE EDM APPARATUS PROVIDED WITH A WIRE SUPPORT ARM PASSED THROUGH THE WALL OF A MACHINING FLUID TANK

[75] Inventor: Roger Girardin, Vernier, Switzerland

[73] Assignee: Charmilles Technologies, S.A., Geneva, Switzerland

[21] Appl. No.: 631,449

[22] Filed: Jul. 16, 1984

[30] Foreign Application Priority Data

Jul. 27, 1983 [CH] Switzerland .......... 4112/83

[51] Int. Cl.$^4$ .......... B23H 1/00; B23H 7/10; B23H 7/26; F16J 15/56
[52] U.S. Cl. .......... 219/69 W; 74/18; 204/206; 277/30; 285/24; 285/27
[58] Field of Search .......... 219/69 W, 69 M, 69 E, 219/69 R, 69 V; 285/24, 27; 308/3.5; 277/30; 83/651.1; 74/18, 18.1, 18.2; 204/129.1, 129.25, 206

[56] References Cited

U.S. PATENT DOCUMENTS

| | | | |
|---|---|---|---|
| 2,182,246 | 12/1939 | Boyer et al. | 277/30 |
| 2,969,248 | 1/1961 | Sulkowski | 277/30 |
| 3,039,779 | 6/1962 | Laird | 277/30 |
| 3,179,423 | 4/1965 | McCloud | 277/30 |
| 4,123,645 | 10/1978 | Shichida et al. | 219/69 W |
| 4,229,010 | 10/1980 | St. Laurent, Jr. | 277/30 |
| 4,270,775 | 6/1981 | Noensie et al. | 285/24 |
| 4,337,385 | 6/1982 | Maropis et al. | 219/69 V |
| 4,460,816 | 7/1984 | Bonga | 219/69 W |
| 4,485,288 | 11/1984 | Schneider | 219/69 R |

FOREIGN PATENT DOCUMENTS 108734 8/1980 Japan .......... 74/18.2

Primary Examiner—C. L. Albritton
Assistant Examiner—Geoffrey S. Evans
Attorney, Agent, or Firm—Hauke and Patalidis

[57] ABSTRACT

A travelling wire EDM apparatus having a pair of support and guide arms for an electrode wire effecting a cut on an electrode workpiece mounted in a tank filled with machining liquid fluid and capable of being displaced along two directions, relative to the support and guide arms, by a cross-slide table. At least the lower arm passes through an opening in one of the walls of the tank, such wall being formed by two parallel panels, a plate being slidably mounted between the two panels and having a tubular member through which the arm is disposed. Flexible joints are mounted between the plate and the two panels and at least one annular seal provides a sliding leakproof connection between the interior of the tubular member and the arm. The sealing structure of the invention permits to pass an electrode wire guide and support arm through the wall of the machining fluid tank without the use of boots and it allows a wide amplitude of relative displacement between the electrode wire support and guide arms and the workpiece mounted in the machining fluid tank.

5 Claims, 3 Drawing Figures

TRAVELLING WIRE EDM APPARATUS PROVIDED WITH A WIRE SUPPORT ARM PASSED THROUGH THE WALL OF A MACHINING FLUID TANK

BACKGROUND OF THE INVENTION

The present invention relates to an EDM apparatus for effecting a cut by electrical discharges on an electrode workpiece by means of an electrode wire stretched and travelling between two guiding arms attached to the apparatus frame, the latter comprising a tank filled with a machining fluid and in which is mounted the electrode workpiece, means being provided for relatively displacing, in two directions, the tank and the two guiding arms, the tank being provided on at least one of its sidewalls with an opening through which one of the guide arms projects, and an arrangement preventing the machining fluid from leaking through the opening.

It is known to provide travelling wire EDM apparatus with a seal taking the form of a boot disposed between the tank wall and the electrode wire guiding arm projecting through an opening in the wall, for the purpose of preventing leakage of the machining fluid. Such boots are used in apparatus wherein the tank only recovers the machining fluid which is supplied to the machining zone. Boots are not practical in apparatus wherein the tank is filled with the machining fluid, in view of the fact that the boots are subjected to the pressure of the fluid filling the tank, which is applied against the tank walls.

SUMMARY OF THE INVENTION

The present invention remedies the inconveniences of the prior art and is characterized by providing a plate which is mounted slidable along one of the directions of relative motion of the electrode workpiece and electrode wire, parallely to the tank wall and covering the opening through the wall, at least one of the guiding arms projecting through the plate such as to allow the relative displacement along the other of the directions, at least one seal being disposed between the plate and the tank wall and at least another seal being disposed between the plate and the arm.

According to a preferred embodiment of the invention, the wall of the machining fluid tank is made of two parallel panels between which slides the plate through which project one of the guiding arms, a flexible seal being disposed between each of the faces of the plate and the corresponding panel, and at least one circular seal providing a leakproof connection between the guiding arm and the plate.

The diverse objects and advantages of the present invention will become apparent to those skilled in the art when the following description of the best mode contemplated for practicing the invention is read in conjunction with the accompanying drawing showing, for illustrative purpose only, an example of structure for an apparatus according to the invention.

DETAILED DESCRIPTION OF THE PREFERRED EMBODIMENT

Figure 1:
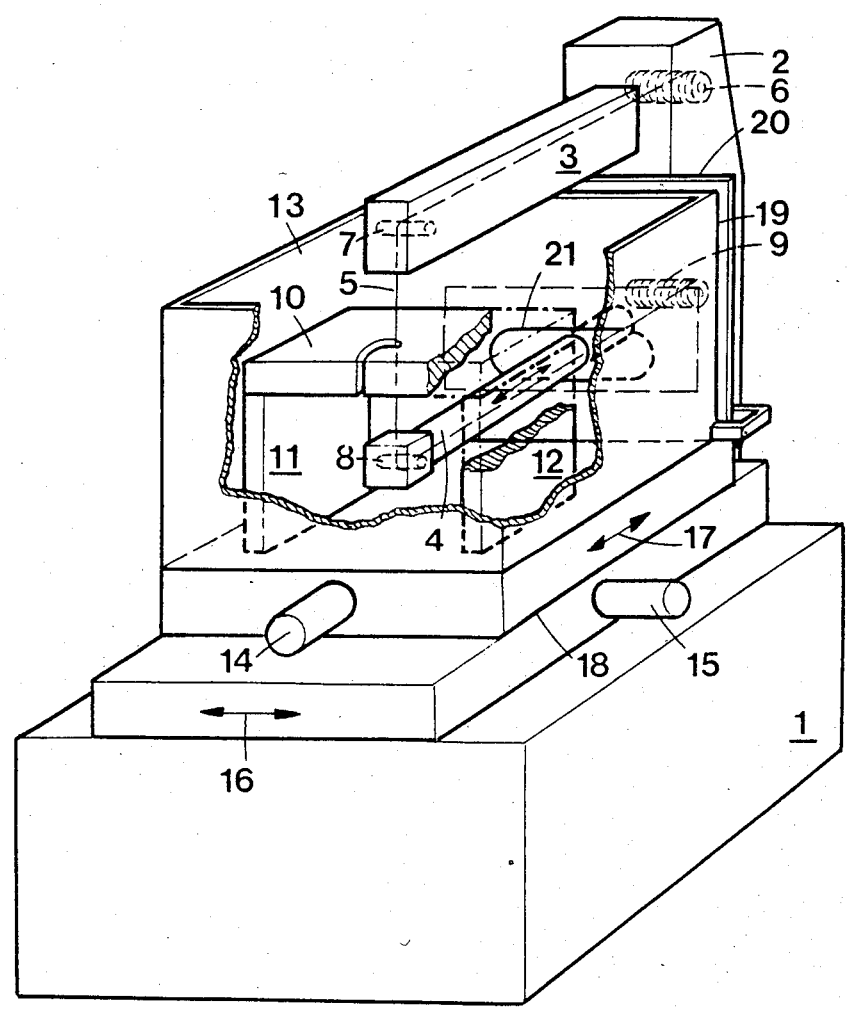
FIG. 1 is a schematic perspective view of a travelling wire EDM apparatus according to the invention.

As shown at FIG. 1, the travelling wire EDM apparatus of the invention comprises a base 1 having an upright member 2 provided with a pair of electrode wire guiding arms 3 and 4. An electrode wire 5 is supplied from a spool 6 and, after passage over rollers 7 and 8, the electrode wire 5 is wound around a receiving spool 9. An electrode workpiece 10 is attached to supports 11 and 12 mounted in the interior of the tank 13 which is filled with a machining fluid. The tank 13 is formed integral on the top of a cross-slide table 18 enabling the electrode workpiece 10 to be displaced relative to the wire 5 along two orthogonal directions arbitrarily represented by arrows 16 and 17. The cross-slide table 18 is driven by a pair of servo motors 14 and 15 under the control of a numerical control unit, not shown. The rear wall of the tank 13 is formed of two panels 19 and 20 disposed parallel to each other and provided with an opening 21 through which project the lower guiding arm 4.

Figure 2:
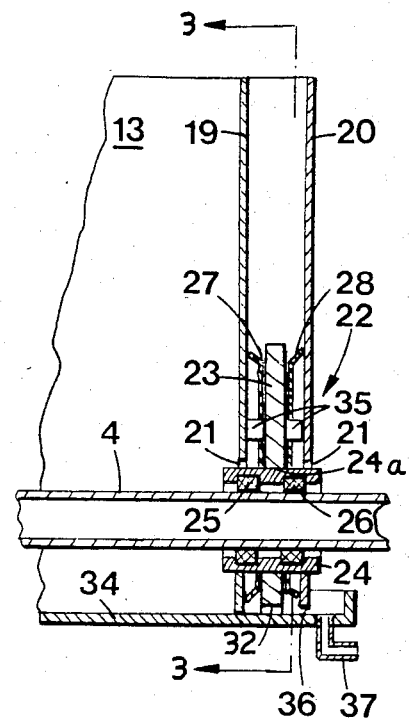
FIG. 2 is a section through the rear wall of the machining fluid tank thereof.
Figure 3:
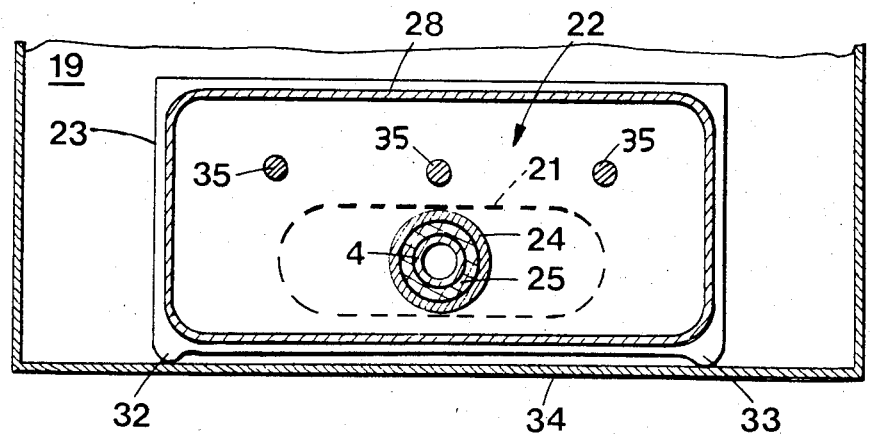
FIG. 3 is a section along line 3—3 of FIG. 2.

The EDM apparatus comprises a sealing structure, shown generally at 22 at FIGS. 2 and 3, preventing the machining fluid filling the tank 13 from flowing through the opening 21. The sealing structure 22 comprises a plate 23 slidably disposed between the two panels 19 and 20 and provided with a tubular member 24 welded through an aperture 24a and projecting on both sides of the plate 23. A pair of annular seals 25 and 26 are installed in appropriate grooves within the tubular member 24 for providing a leakproof joint between the interior of the tubular member 24 and the peripheral surface of the guiding arm 4 adapted to reciprocate through the tubular member 24. A pair of flexible seals, 27 and 28 respectively, are affixed to both faces of the plate 23 such as to form a dam in the space between each face of the plate 23 and the corresponding surfaces of the panels 19 and 20. The plate 23 is further provided with a pair of support prongs 32 and 33, FIG. 3, in sliding engagement with the bottom 34 of the tank 13 and three guiding and spacer members 35 maintaining the plate 23 in spaced relationship relative to the panels 19 and 20. The tank 13 is provided below the plate 23 and the panel 20 with a gutter 36 for catching any fluid leaking through the annular seals 25 and 26 and the flexible seals 27 and 28. A return line 37 returns the machining fluid that may leak past the sealing structure 22 into the gutter 36 to the interior of the tank 13 by means of a pump, not shown.

It will be readily apparent to those skilled in the art that the example of structure herein described and illustrated has been given for illustrative purpose only and that, for example, the rear wall of the machining fluid tank 13 could be made of a single panel, the plate 23 being slidably supported between slides affixed to the panel. The flexible joints 27 and 28 could also be replaced by joints having a configuration different from that illustrated.

It will also be apparent that both wire guiding arms could be provided with a sealing joint through the machining fluid tank in structure wherein the wire is travelling horizontally within the machining fluid tank.

Having thus described the present invention by way of a typical example of structure well designed for accomplishing the objects of the invention, modifications whereof will be apparent to those skilled in the art, what is claimed as new is as follows:

1. A travelling wire EDM apparatus for cutting by electrical discharges an electrode workpiece by means of an electrode wire stretched and travelling between two guide arms, said apparatus having a base supporting said guide arms and a tank filled with machining fluid, an electrode workpiece mounted within said tank, said apparatus having means for displacing said tank along two displacement axes relative to said electrode wire guide arms, at least one opening through a wall of said tank, one of said guide arms projecting through said opening, and sealing means preventing said machining fluid from leaking through said opening, said sealing means comprising a plate slidably mounted along one of said displacement axes, said plate being disposed parallel to said tank wall and overlapping said opening, an aperture in said plate, a tubular member disposed through said plate aperture and affixed rigidly in said plate aperture in a leakproof manner, said one of said guide arms being supported slidably through said tubular member such as to enable said one of said guide arms to be displaced along said displacement axes, at least one seal disposed between the plate and the tank wall, and at least one annular seal mounted internally in said tubular member in engagement with a peripheral surface portion of said one of said guide arms.

2. An apparatus according to claim 1 wherein said tank wall comprises two parallel panels, said plate being disposed between said parallel panels, and a flexible seal is disposed between each of the faces of said plate and a corresponding panel.

3. The apparatus of claim 2 further comprising a gutter disposed below said panels for collecting machining fluid leaking past said seals.

4. The apparatus of claim 2 wherein said plate has bearing members engaged with the bottom of said machining fluid tank.

5. The apparatus of claim 2 wherein said plate has on each of its faces guiding means engaged with each of said panels.

* * * * *